United States Patent [19]

Stahura et al.

[11] Patent Number: 4,619,875
[45] Date of Patent: Oct. 28, 1986

[54] ANTI-STRATIFICATION BATTERY SEPARATOR

[75] Inventors: Daniel W. Stahura, Anderson; Verl V. Smith, Jr., Muncie, both of Ind.

[73] Assignee: General Motors Corporation, Detroit, Mich.

[21] Appl. No.: 802,588

[22] Filed: Nov. 27, 1985

[51] Int. Cl.$^4$ .............................................. H01M 2/18
[52] U.S. Cl. ................................... 429/143; 429/147; 429/81
[58] Field of Search ............... 429/143, 146, 147, 81, 429/247

[56] References Cited

U.S. PATENT DOCUMENTS

| | | | |
|---|---|---|---|
| 686,886 | 11/1901 | Chamberlain | 429/143 |
| 1,368,093 | 2/1921 | Allen | 429/143 |
| 2,117,382 | 5/1938 | Wells | 429/143 X |
| 2,198,845 | 4/1940 | Smithers | 429/146 |
| 4,000,352 | 12/1976 | Hollenbeck et al. | 429/147 |
| 4,403,024 | 9/1983 | Gordon et al. | 429/146 |

*Primary Examiner*—Anthony Skapars
*Attorney, Agent, or Firm*—Lawrence B. Plant

[57] ABSTRACT

A battery separator including a plurality of superposed, generally concave ribs each extending from one lateral edge of the separator to the other to reduce electrolyte stratification within the battery.

2 Claims, 2 Drawing Figures

ANTI-STRATIFICATION BATTERY SEPARATOR

This invention relates to microporous, interplate separators for electric storage batteries and more particularly to a rib configuration therefor for reducing electrolyte stratification within the battery.

BACKGROUND OF THE INVENTION

Battery separators are well known in the art and comprise microporous membranes interjacent adjacent plates (i.e., electrodes) in a stack of plates forming a cell element. Such separators serve to separate, and electrically isolate, one plate (e.g., positive electrode) from the next (e.g., negative counterelectrode) and have sufficiently small pores to suppress interelectrode dendrite growth, but sufficiently high porosity to permit electrolyte mobility within the cell. Typical such materials comprise sintered PVC particles or microporous polyethylene such as described in Baylor et al Pat. No. 3,551,210 or Larson et al Pat. No. 3,351,495 respectively. Such battery separators include a plurality of ribs on the face thereof to space the separator from one of the plates (i.e., usually the positive plate). The separator may be used as individual pieces which are merely interspersed between the several plates or in the form of envelopes wrapped around one of the plates. In the latter instance, a sheath for the plate is formed by folding a length of the separator sheet about the bottom edge of the plate and heat sealing the lateral edges of the sheet together to form an envelope.

Lead-acid batteries, among others, are known to be susceptible to electrolyte concentration variations from top to bottom. This problem is particularly acute during the recharge of deep discharge batteries. In this regard, the heavy $H_2SO_4$ formed at the plates during recharge settles to the bottom of the battery causing higher concentrations of $H_2SO_4$ thereat than at the top of the battery. This electrolyte concentration imbalance is known as electrolyte stratification and is detrimental to battery performance and life. It has been proposed to avoid electrolyte stratification by pumping the electrolyte from the bottom of the battery to the top thereof to promote better concentration uniformity. Some such proposals are shown in Sundberg, U.S. Pat. Nos. 3,083,253; Sundberg, 3,305,404; Halsey 734,549; Scholl et al 4,194,060 and Newell 4,469,759. Such proposals are complex solutions to the problem. It would be much more desirable to prevent, or at least minimize, stratification in the first instance, particularly if it could be accomplished in a simple cost effective way.

It is accordingly an object of the present invention to provide an improved battery separator having ribs on the face thereof designed and arranged so as to substantially avoid the accumulation of high concentrations of sulfuric acid at the bottom of the battery. This and other objects and advantages of the present invention will become more readily apparent from the detailed description thereof which follows.

BRIEF DESCRIPTION OF THE INVENTION

The present invention comprehends a separator for a storage battery comprising a thin microporous, dendrite-suppressing sheet (i.e., folded or unfolded) interjacent plates of opposite polarity in a battery cell element. The sheet has a top edge, bottom edge and two lateral edges which together define the principal face of the separator and a plurality of superposed, concave (e.g., V-shape or arcuate) ribs which extend across the face substantially from one lateral edge to the other. Such concave ribs provide a plurality of depressions or pockets at different levels between the plates which trap the heavy acid and prevent it from descending to the bottom of the battery. At the same time, the undersides of the ribs act as baffles for directing any gas bubbles which form in the region between the ribs outwardly toward the lateral edges of the cell element for bubbling to the top of the battery along the outside edge of the element adjacent the container wall.

DETAILED DESCRIPTION OF THE INVENTION

Figure 1:
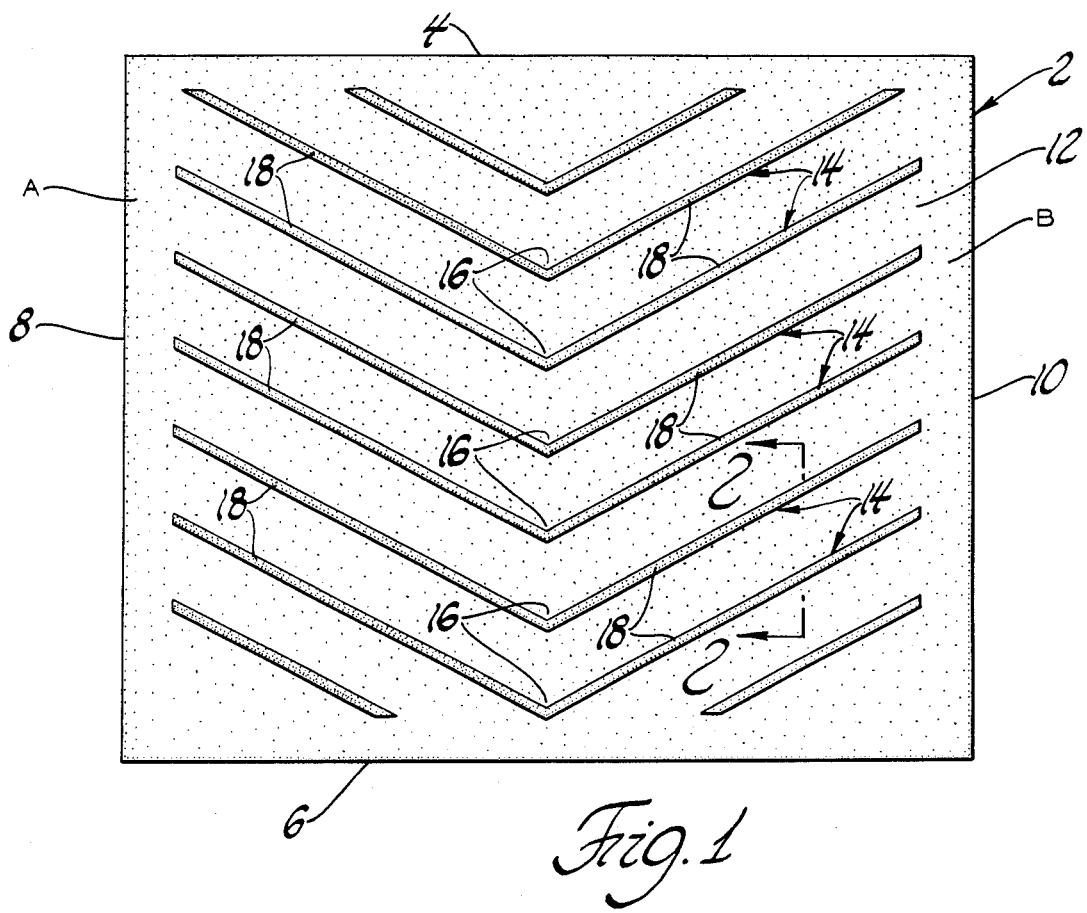
Figure 2:
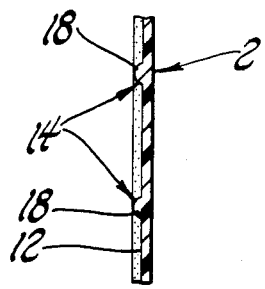

The invention may be better understood when considered in the light of the following detailed description of a preferred embodiment thereof which is given hereafter in conjunction with the drawings wherein:

FIG. 1 is a front-elevational view of a battery separator in accordance with the present invention; and FIG. 2 is a side-sectional view in the direction 2—2 of FIG. 1.

FIG. 1 depicts a battery separator 2 having an upper edge 4, a bottom edge 6 and lateral edges 8 and 10 defining the principal face 12 of the separator. A plurality of V-shaped ribs 14 extend across the face 12 substantially from one lateral edge 8 to the other lateral edge 10. Ribless regions A and B adjacent the lateral edges 8 and 10 respectively may be provided for those applications where the edges of the separator are later to be joined (e.g., heat sealed) to another separator to form an envelope for a battery plate.

During recharge of the battery, heavier electrolyte (e.g., $H_2SO_4$) which is formed near the surface of the plate between each set of ribs 14 tends to fall down along the surface of the plate and will be directed toward and trapped in the pockets 16 formed at the lowermost portions of the ribs. Legs 18 of the V-shaped ribs 14 angle upwardly towards the lateral edges 8 and 10 of the separator 2. The legs 18 serve as baffles to deflect and direct any gas bubbles formed between adjacent ribs towards the lateral edges of the plate stack forming the cell element and hence harmlessly outboard the cell element to rise to the top of the battery along the sides of the element adjacent the container wall.

While the invention has been disclosed primarily in terms of a specific embodiment thereof it is not intended to be limited thereto but rather only to the extent set forth hereafter in the claims which follow.

The embodiments of the invention in which an exclusive property or privilege is claimed are defined as follows:

1. In a separator for an electric storage battery comprising a thin microporous sheet for suppressing dendrite growth between adjacent plates of the battery, said sheet having top, bottom and lateral edges defining the principal face of the separator and a plurality of ribs formed on the surface of said face the improvement comprising:

said ribs each (1) having a concave shape, (2) being superposed one over another and (3) extending laterally across said face substantially from one said lateral edge to the other said lateral edge for reducing the accumulation of highly concentrated electrolyte at the bottom of the battery during recharge.

2. In a separator for an electric storage battery comprising a thin microporous sheet for suppressing dendrite growth between adjacent plates of the battery, said sheet having top, bottom and lateral edges defining the principal face of the separator and a plurality of ribs formed on the surface of said face the improvement comprising:

said ribs each being superposed over another and extending in a V-shape configuration laterally across said face substantially from one said lateral edge to the other said lateral edge for reducing the accumulation of highly concentrated electrolyte at the bottom of the battery during recharge.

* * * * *